3,717,577
STABILIZED OLEFIN POLYMERS
Clive D. Moon, Bartlesville, Okla., assignor to
Phillips Petroleum Company
No Drawing. Continuation of application Ser. No.
639,636, May 19, 1967. This application Feb. 6,
1970, Ser. No. 9,091
Int. Cl. C08g *51/54*
U.S. Cl. 260—45.7 S         5 Claims

ABSTRACT OF THE DISCLOSURE

Olefin polymers are stabilized to minimize melt index or melt flow decrease at elevated temperatures by admixing the polymer with an alkali metal nitrite, an alkali metal nitrite and an alkali metal bisulfite, or mixtures thereof, the concentration of the alkali metal nitrite and the alkali metal bisulfite in the stabilized polymer being in the range of 0.005 to 0.3 weight per cent each. When minimum discoloration of the polymer is desired, the concentration of the alkali metal bisulfite and/or the alkali metal nitrite is maintained in the range of 0.005 to 0.01 weight percent.

---

This invention relates to stabilized olefin polymers. In one aspect, this invention relates to a method for stabilizing olefin polymers so as to minimize melt index or melt flow degradation at elevated temperatures.

Polyethylene or other plastic materials prepared from olefins have many commercial applications because of various desirable physical and chemical characteristics and inexpensiveness of manufacturing. For most applications, these normally solid polymers are processed by heating them to a temperature level where they become molten and then shaping the molten polymer into the desired form by various techniques such as extrusion, injection molding, blow molding, centrifugal casting and other types of thermoforming. At the elevated temperatures necessary to become molten, many of these polymers exhibit a melt index or melt flow decrease with a corresponding molecular weight increase, a characteristic which causes problems for both the fabricator using the polymer and the producer of the polymer.

A melt index or melt flow decrease during hot-melt processing may prevent or limit the use of a polymer by the fabricator for specific applications because of processing problems, even though the use of the polymer for those applications may otherwise be desirable. For example, some polymeric materials are practically unsuitable for certain types of film manufacture because of a melt index or melt flow decrease in hot-melting processing which tends to plug small openings in the process equipment. Another example of a processing problem for the fabricator resulting from a melt index or melt flow decrease during hot-melt processing is that cycle times for various molding processes are increased because of the longer time required by the less fluid polymer to fill the molds. Reuse of cut-out portions, trimmings, etc., are also limited because of the flow property changes in the polymer occurring during processing.

The producer of the polymer often processes it into a form acceptable for use by the fabricator, such as pelltizing the polymer by extrusion techniques. A melt index or melt flow decrease during this processing results in flow characteristic changes, and therefore different processing characteristics, which can limit the potential applications for the processed polymer.

Various methods proposed for stabilizing these polymers have met with varying degrees of success, but none has provided a fully adequate solution of the problem. Consequently, industry has been striving for the past several years to find improved methods for stabilizing these materials.

In some applications where the polymer is non-pigmented and clearness is desired, e.g. lamination of a film onto paper or the like, it is important that the stabilized polymer have minimum discloroation.

I have found that olefin polymers can be stabilized against melt index or melt flow decrease at elevated temperatures by admixing the polymer with small amounts of an alkali metal nitrite, an alkali metal nitrite and an alkali metal bisulfite, or mixtures of these nitrites and bisulfites. I have also found that a critical amount of these additives can be admixed with the polymer to obtain melt index or melt flow stabiliity without inducing any adverse discoloration into the polymer. Polymers stabilized by this invention also have other improved processability characteristics.

Accordingly, an object of this invention is to provide an improved method for stabilizing olefin polymers against melt index or melt flow decrease during hot-melt processing.

Another object of this invention is to provide an improved method for stabilizing olefin polymers against melt index or melt flow decrease that induces minimum discoloration into the stabilized polymer.

A further object of this invention is to provide a new olefin polymer composition capable of being hot-melt processed without decrease of melt index or melt flow.

Other objects, aspects, and advantages of this invention will become apparent to those skilled in the art from the following detailed description and appended claims.

According to this invention, olefin polymers are stabilized to minimize melt index or melt flow decrease at elevated temperatures by admixing the polymer with an alkali metal nitrite, an alkali metal nitrite and an alkali metal bisulfite, or mixtures thereof, the quantity or alkali metal nitrite(s) and the alkali metal bisulfite(s) added being in the range of 0.005 to 0.3 percent by weight each, based on the total weight of the polymer and the stabilizing additive. The term "alkali metal" as employed herein is used to designate the group comprising lithium, sodium, potassium, rubidium, cesium, and francium. The term "stabilizing additive" as employed herein is used to designate an alkali metal nitrite by itself, mixtures of alkali nitrites, both an alkali metal nitrite and an alkali metal bisulfite, a mixture of alkali metal nitrites by themselves, and both a mixture of alkali metal nitrites and a mixture of alkali metal bisulfites.

Also in accordance with this invention, when minimum discoloration of the stabilized polymer is desired; the quantities of the alkali metal nitrite(s), and, optionally, the alkali metal bisulfite(s), added to the polymer are in the range 0.005 to 0.01 percent by weight each, based on the total weight of the polymer and stabilizing additive. Concentrations of alkali metal nitrite(s) or alkali metal bisulfite(s) in the stabilized polymer in excess of 0.01 weight percent, although satisfactory for minimizing the melt index or melt flow degradation, tend to cause the polymer to become a brownish color.

When used by itself, concentrations of alkali metal nitrite(s) in the stabilized polymer in excess of 0.3 weight percent do not lend appreciable additional melt index or melt flow stabililty or improved processability characteristics. The use of both alkali metal nitrite(s) and alkali metal bisulfite(s) produce better melt index or melt flow stability than alkali metal nitrite(s) alone; however, concentrations of either the alkali metal nitrite(s) or the alkali metal bisulfite(s) in the stabilized polymer, when both are used, in excess of 0.3 weight percent each, tend to produce some degree of foaming of the polymer.

The alkali metal nitrite(s) and the alkali metal bisulfite(s) can be added as mixtures or added individually and can be added in equal amounts or varying amounts so long as the total quantity of each is in the range of 0.005 to 0.3 percent by weight based on the total weight of the stabilized polymer.

The stabilizing additives of this invention can be added to the polymer by any suitable means which effects a homogeneous distribution of the additive in the polymer. The stabilizing additive can be mixed with the polymer in any particulate form, such as granular, pellet or powder fluff, by mechanical mixing techniques such as dry blending, milling, or kneading with devices such as a Henschel mixer, a Banbury mixer, a Waring blender, a roll mill, and the like.

Another method of mixing involves dissolving the stabilizing additives in a volatile solvent in which the additives are soluble, such as acetone, ethyl ether, methyl alcohol, ethyl alcohol, propyl alcohol, methyl ethyl ketone, and the like, and spraying the particulate polymer with the resultant solution. Such spraying of the particulate polymer can be done, for example, during conveying of the polymer in a screw conveyor or while tumbling the polymer particles in a drum. The solvent can be subsequently removed by heating, purging with air, or the like.

Another method for incorporating the stabilizing additives involves mixing the stabilizing additives in a water-alcohol solution or any other suspending media and mixing the polymer therewith.

The stabilizing additives of this invention can be effectively employed in olefin polymers which are subject to degradation of melt index or melt flow. As employed herein, the term "polymer" is used to designate either homopolymers or copolymers, or blends thereof. This invention is especially effective with polymers of 1-olefins having 2 through 8 carbon atoms per molecule. Representative examples of 1-olefins to obtain such homopolymers include ethylene, propylene, butene-1, pentene-1, 4-methyl-pentene-1, hexene-1, heptene-1, octene-1, and the like. Representative examples of copolymers of two or more of such olefins include copolymers of ethylene and propylene, ethylene and butene-1, propylene and butene-1, ethylene and hexene-1, propylene and octene-1, ethylene and 4-methylpentene-1, ethylene and octene-1, hexene-1 and octene-1, and the like.

The olefin polymers capable of being stabilized in accordance with this invention can be made by any of the various known polymerization processes. For example, polymers prepared by the polymerization process described in U.S. Pat. No. 2,825,721, Hogan et al. (1958), and British Pat. No. 853,414, Phillips Petroleum Company (1960), can be stabilized with the additives of this invention. Polymers made by the high pressure process or with organometal catalyst systems are examples of other polymers that can also be used. The polymer to be stabilized can contain other additives such as stress-cracking inhibitors, antioxidants, fillers, pigments, vulcanization accelerators, plasticizers, and the like. The stabilizing additives of this invention are effective with or without these other additives.

The following examples are presented to further illustrate this invention and are not to be construed as limiting same thereto.

EXAMPLE I

Several samples were prepared from finely-divided polyethylene made by the particle-form process disclosed in British Pat. No. 853,414 using a chromium oxide-containing catalyst. Antioxidants (0.04 weight percent 2,6-di-tert-butyl-4-methylphenol and 0.06 weight percent dilaurylthiodipropionate) were added to the sample by blending in a Henschel mixer at 150° F. Various amounts of sodium nitrite or potassium nitrite and sodium bisulfite were added to the samples in a small Waring blender at about 100° F. Sodium nitrite and sodium bisulfite were not added to one sample which was used as a control. The polymer had a melt index of 0.11 dg./min. (ASTM D 1238–62T, Condition E) and a density of 0.96 g./cc. (ASTM D 1505–63T). The test samples were pelletized in a Davis Standard 1.5-inch extruder, at 400–550° F. The pelletized samples were heated to 550° F. and the melt drop-off with time was determined in a melt indexer using a 2204-gram dead load piston. The weight of polymer extruded through the orifice in the melt indexer, measured for 5-minute intervals, is tabulated in Table I.

TABLE I

| Concentration of stabilizing additive in sample, weight percent | | Weight of polymer extruded, grams, for indicated time interval, minutes | | | | | | Percentage drop-off |
|---|---|---|---|---|---|---|---|---|
| $NaNO_2$ | $NaHSO_3$ | 0–5 | 5–10 | 10–15 | 15–20 | 20–25 | 25–30 | |
| [1] 0 | 0 | 0.32 | 0.23 | 0.21 | 0.20 | 0.20 | 0.19 | 40.6 |
| 0.005 | 0 | 0.33 | 0.26 | 0.24 | 0.25 | 0.26 | 0.25 | 27.3 |
| 0.005 | 0.005 | 0.32 | 0.25 | 0.25 | 0.26 | 0.26 | 0.26 | 21.9 |
| 0.008 | 0 | 0.33 | 0.28 | 0.27 | 0.27 | 0.28 | 0.28 | 18.2 |
| 0.008 | 0.008 | 0.29 | 0.25 | 0.25 | 0.25 | 0.25 | 0.25 | 13.8 |
| 0.01 | 0 | 0.34 | 0.30 | 0.30 | 0.30 | 0.30 | 0.30 | 11.8 |
| 0.01 | 0.01 | 0.34 | 0.27 | 0.27 | 0.27 | 0.27 | 0.28 | 20.6 |
| 0.025 | 0 | 0.31 | 0.27 | 0.27 | 0.26 | 0.26 | 0.26 | 16.1 |
| 0.025 | 0.025 | 0.35 | 0.34 | 0.34 | 0.33 | 0.34 | 0.35 | 5.7 |
| 0.05 | 0 | 0.38 | 0.34 | 0.34 | 0.34 | 0.34 | 0.34 | 10.5 |
| 0.1 | 0 | 0.42 | 0.38 | 0.37 | 0.37 | 0.38 | 0.38 | 11.9 |
| [2] 0.0075 | 0.0075 | 0.41 | 0.34 | 0.32 | 0.34 | 0.32 | 0.32 | 21.9 |
| $KNO_2$ | | | | | | | | |
| [2] 0.0095 | 0.0075 | 0.42 | 0.36 | 0.35 | 0.35 | 0.35 | 0.35 | 16.7 |

[1] Control.
[2] 0.11 mmol.

As can be seen from these data, the polymer melt drop-off with time is reduced substantially with the addition of the stabilizing additives of this invention. For example, at a level of 0.025 weight percent of each additive, melt drop-off is substantially eliminated.

As the sodium nitrite concentration was increased, the color of the stabilized polymer varied from a slight off-white color at 0.005 weight percent to a more intense off-white color at 0.01 weight percent. The polymer discoloration at this higher sodium nitrite concentration was considered to be acceptable for most applications of non-pigmented polymers. As the concentration of sodium nitrite was increased above 0.01 weight percent, the color of the stabilized polymer varied from a light brown to a more intense brownish color. This discoloration makes the polymer unacceptable for many uses where non-pigmented polymers are desired but is acceptable for most pigmented polymers and other uses for whiteness are not required.

EXAMPLE II

Several samples of finely-divided polyethylene were prepared in the same manner as in Example I except the antioxidants were not added and sodium nitrite was added in a water-ethyl alcohol solution. One sample was not treated and served as the control. The samples were mixed with the indicated amounts of sodium nitrite dissolved in sufficient ethyl alcohol to thoroughly wet the polymer particles. The samples so treated were allowed to stand at room temperature for sufficient time for the solvent to evaporate. All the samples were pelletized in in the same manner as in Example I. The pelletized samples were heated to 374° F. and the melt drop-off with time was determined in a melt indexer using a 5000-gram dead load piston. The weight of polymer extruded through the orifice in the melt indexer, measured for 5-minute intervals, is tabulated in Table II.

TABLE II

| Concentration of sodium nitrite [1] | Weight of polymer extruded, grams, for indicated time interval, minutes | | | | | | Percentage drop-off |
|---|---|---|---|---|---|---|---|
| | 0–5 | 5–10 | 10–15 | 15–20 | 20–25 | 25–30 | |
| 0 (control) | 1.0 | 0.6 | 0.42 | 0.32 | 0.23 | 0.18 | 82 |
| 0.02 | 1.1 | 1.1 | 1.0 | 1.0 | 1.0 | 1.0 | 10 |
| 0.05 | 1.1 | 1.1 | 1.1 | 1.0 | 1.0 | 1.0 | 10 |
| 0.1 | 1.1 | 1.1 | 1.1 | 1.1 | 1.0 | 1.0 | 10 |
| 0.25 | 1.0 | 1.0 | 1.0 | 1.0 | 1.0 | 1.0 | 0 |

[1] In sample, weight percent.

As can be seen from these data, the polymer melt drop-off with time is decreased substantially with the additives of this invention even though other conventional antioxidants are not added to the polymer. Even at the low concentration of 0.02 weight percent the drop-off was reduced to 10 percent, as compared to 82 percent for the same polymer containing no additive.

EXAMPLE III

The melt index of several samples prepared and pelletized in the same manner as in Example I was measured, and all samples, including a control sample not having sodium nitrite or sodium bisulfite added thereto, were then extruded into sheets 45 mils thick and approximately 11 inches wide in a Davis Standard 1.5-inch extruder at about 400° F. Portions of these sheets were clamped into a 9-inch by 9-inch frame, heated to about 260° F. and the sag (drape) at the center of the frame at room temperature was measured. Other portions of the sheets were thermoformed into cups having an L/D ratio of 1.7/1 and an approximate size of 1 pint and these cups were observed for tear. The results of these tests are tabulated in Table III.

TABLE III

| Concentration of NaNO$_2$ and NaHSO$_3$ [a] | Color | Melt index, dg./min. | Drape, min. | Observation of thermoformed cup |
|---|---|---|---|---|
| 0 (control) | White | 0.11 | 0.13 | Considerable tear through. |
| 0.004 | Off-white | 0.13 | 0.31 | No tear through. |
| 0.0075 | do | 0.18 | 0.38 | Do. |
| 0.05 | Light brown | 0.21 | 0.38 | Do. |

[a] In sample, weight percent.

From these data it is apparent that the polymer stabilized in accordance with this invention exhibited no initial melt drop-off; in fact, there was an increase in the melt index. The higher drape and no tear through of the thermoformed cup indicates improved thermoforming and processability properties.

EXAMPLE IV

Several samples were prepared from finely-divided polyethylene prepared in accordance with U.S. Pat. No. 2,825,721, using a chromium oxide-containing catalyst, the polyethylene having a melt index of 37 dg./min. (ASTM D 1238–62T, Condition E) and a density of 0.96 g./cc. (ASTM D 1505–63T). One sample was not treated and served as the control while various amounts of sodium nitrite and sodium bisulfite in finely divided form were blended in a Henschel mixer at 150° F. with other samples. All the samples were pelletized in the same manner as in Example I and then mixed into a 50/50 blend with pellets of a low-density polyethylene made by a high-pressure process having a melt index of 3 dg./min. (ASTM D 1238–62T, Condition E) and a density of 0.923 g./cc. (ASTM D 1505–63T). The polymer blends were used in paper-coating tests in a Frank Egan laboratory extrusion coater-laminator to determine the minimum coating weight that can be used and still obtain a satisfactory coating. The results of these tests are tabulated in Table IV.

TABLE IV

| Concentration of each additive in polymer sample run to blending, weight percent | Blended polymer weight per ream of paper, lb./3000 sq. ft. |
|---|---|
| 0 (control) | 4.4–5.5 |
| 0.0025 | 1.1 |
| 0.02 | 0.65 |
| 0.05 | 0.5 |

From these data, it is apparent that polyethylene stabilized in accordance with this invention has improved processability for laminated films. With the melt index decrease minimized, the more fluid polymer can be more readily processed onto the substrate, thereby allowing an adequate coating with a thinner film.

As will be evident to those skilled in the art, many modifications can be practiced within the scope and spirit of this invention and it should be understood that the latter is not limited to the above discussion.

What is claimed is:

1. A polyolefinic composition stabilized against melt flow decrease at processing temperatures comprising normally solid olefin polymers selected from the group consisting of homopolymers of the monoolefins; ethylene, propylene, butene-1, pentene-1, 4-methylpentene-1, hexene-1, heptene-1 and octene-1, copolymers of two or more of the aforesaid monoolefins and mixtures thereof in admixture with from about 0.005 to about 0.3 weight percent, based on total weight of admixture, of an additive selected from the class consisting of at least one alkali metal nitrite, at least one alkali metal bisulfite, or mixtures thereof.

2. A composition according to claim 1 wherein the amount of said alkali metal nitrite and said alkali metal bisulfite each is in the range of 0.005 to 0.01 weight percent.

3. A composition according to claim 1 wherein said alkali metal nitrite is selected from the group consisting of sodium nitrite and potassium nitrite and said alkali metal bisulfite is potassium bisulfite.

4. A polyolefinic composition stabilized against melt flow decrease at processing temperatures comprising normally solid polyethylene in admixture with from about 0.005 to about 0.3 weight percent, based on total weight of admixture, of at least one alkali metal nitrite, at least one alkali metal bisulfite, or mixtures thereof.

5. A composition according to claim 4 wherein said alkali metal nitrite is selected from the group consisting of sodium nitrite and potassium nitrite and said alkali metal bisulfite is potassium bisulfite.

References Cited

UNITED STATES PATENTS

| | | | |
|---|---|---|---|
| 3,210,321 | 10/1965 | Doyle | 260—45.75 |
| 2,878,214 | 3/1959 | Holmes et al. | 260—32.6 |
| 2,879,257 | 3/1959 | Walter et al. | 260—45.9 |
| 2,491,444 | 12/1949 | Cox et al. | 260—45.9 |
| 3,325,447 | 6/1967 | Kasparik | 260—45.9 |

FOREIGN PATENTS

| | | | |
|---|---|---|---|
| 950,022 | 2/1964 | Great Britain | 260—45.9 |

DONALD E. CZAJA, Primary Examiner

W. E. PARKER, Assistant Examiner

U.S. Cl. X.R.

260—45.9